July 9, 1935.	L. H. WILCOX	2,007,735
VEHICLE SPRING CONSTRUCTION
Filed March 19, 1935	3 Sheets-Sheet 1

Inventor

L. H. Wilcox

By Clarence A. O'Brien
Attorney

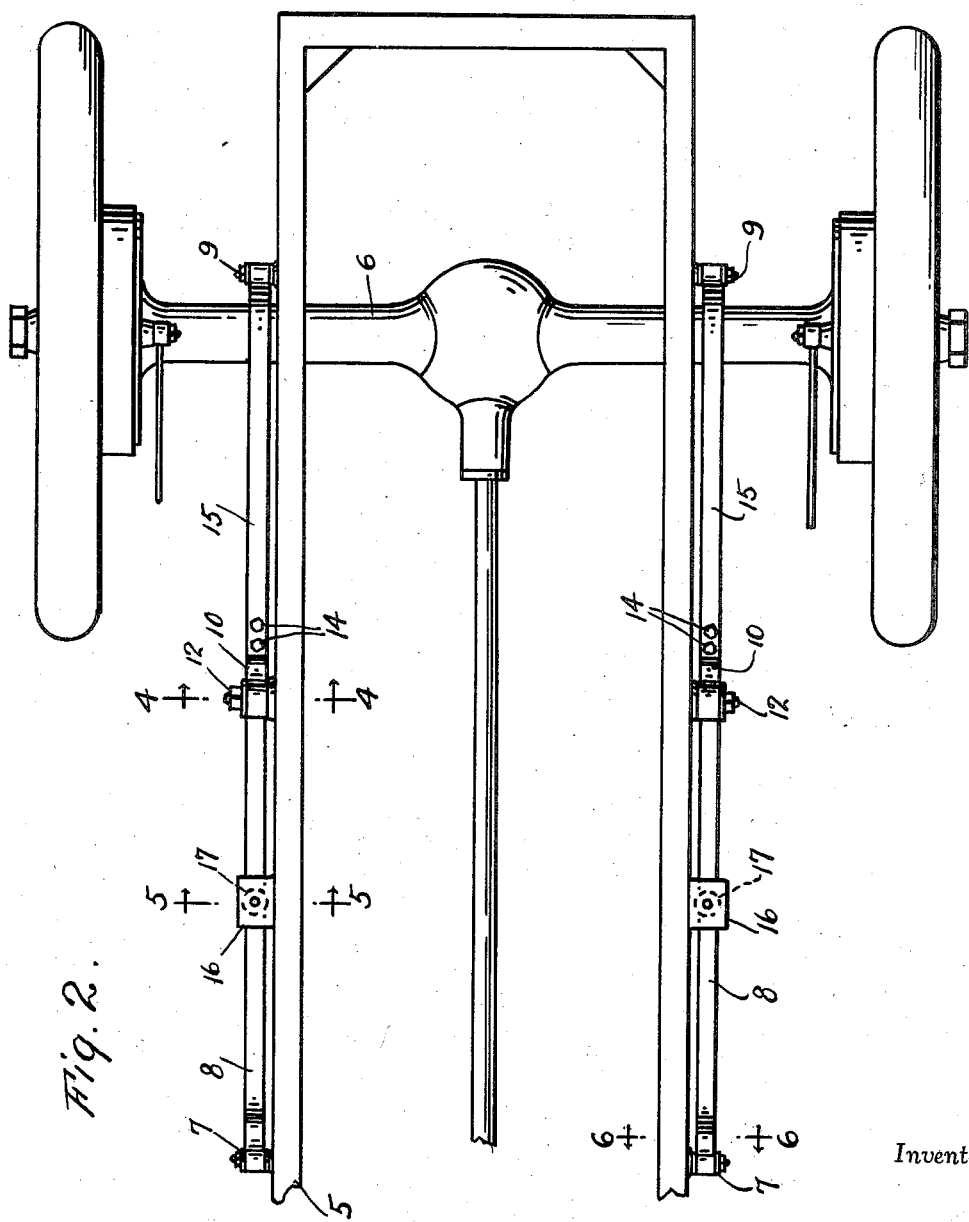

July 9, 1935.  L. H. WILCOX  2,007,735
VEHICLE SPRING CONSTRUCTION
Filed March 19, 1935  3 Sheets-Sheet 3
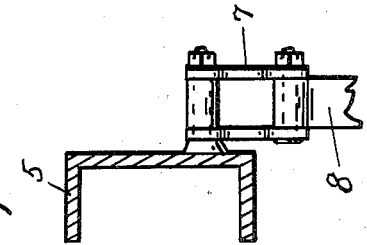
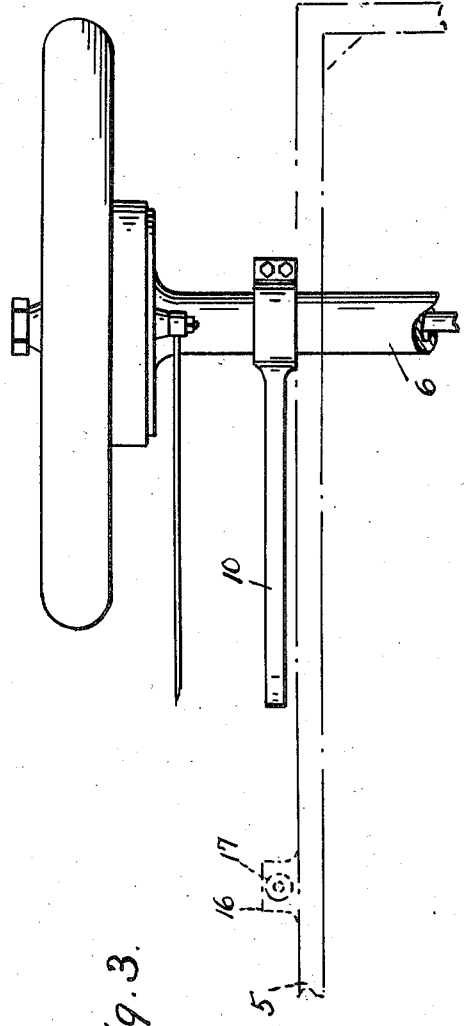
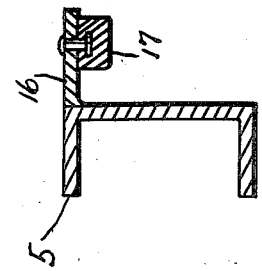
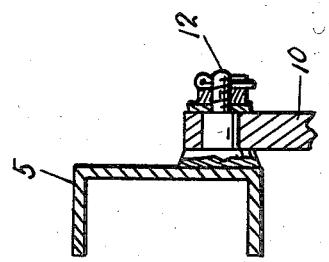
Inventor
*L. H. Wilcox*
By *Clarence A. O'Brien*
Attorney

UNITED STATES PATENT OFFICE 2,007,735

VEHICLE SPRING CONSTRUCTION

Lyle Hutchinson Wilcox, Vancouver, British Columbia, Canada

Application March 19, 1935, Serial No. 11,872

2 Claims. (Cl. 267—19)

The present invention relates to a vehicle spring construction designed particularly for automobiles and the like and the prime object of the invention resides in the provision of means which incorporates shock absorbing features in a spring mounting.

Another important object of the invention resides in the provision of a vehicle spring construction of this nature which is simple in its construction, comparatively inexpensive to manufacture, strong and durable, thoroughly efficient and reliable in use and otherwise well adapted to the purpose for which it is designed.

With the above and numerous other objects in view as will appear as the description proceeds, the invention consists in certain novel features of construction, and in the combination and arrangement of parts as will be hereinafter more fully described and claimed.

In the drawings:

Figure 2 is a top plan view thereof.

Figure 3 is a top plan view showing the arm mounted on the rear axle housing.

Figure 4 is a detail section taken substantially on the line 4—4 of Figure 2.

Figure 5 is a similar view taken substantially on the line 5—5 of Figure 2.

Figure 6 is a similar view taken substantially on the line 6—6 of Figure 2.

Figure 1:
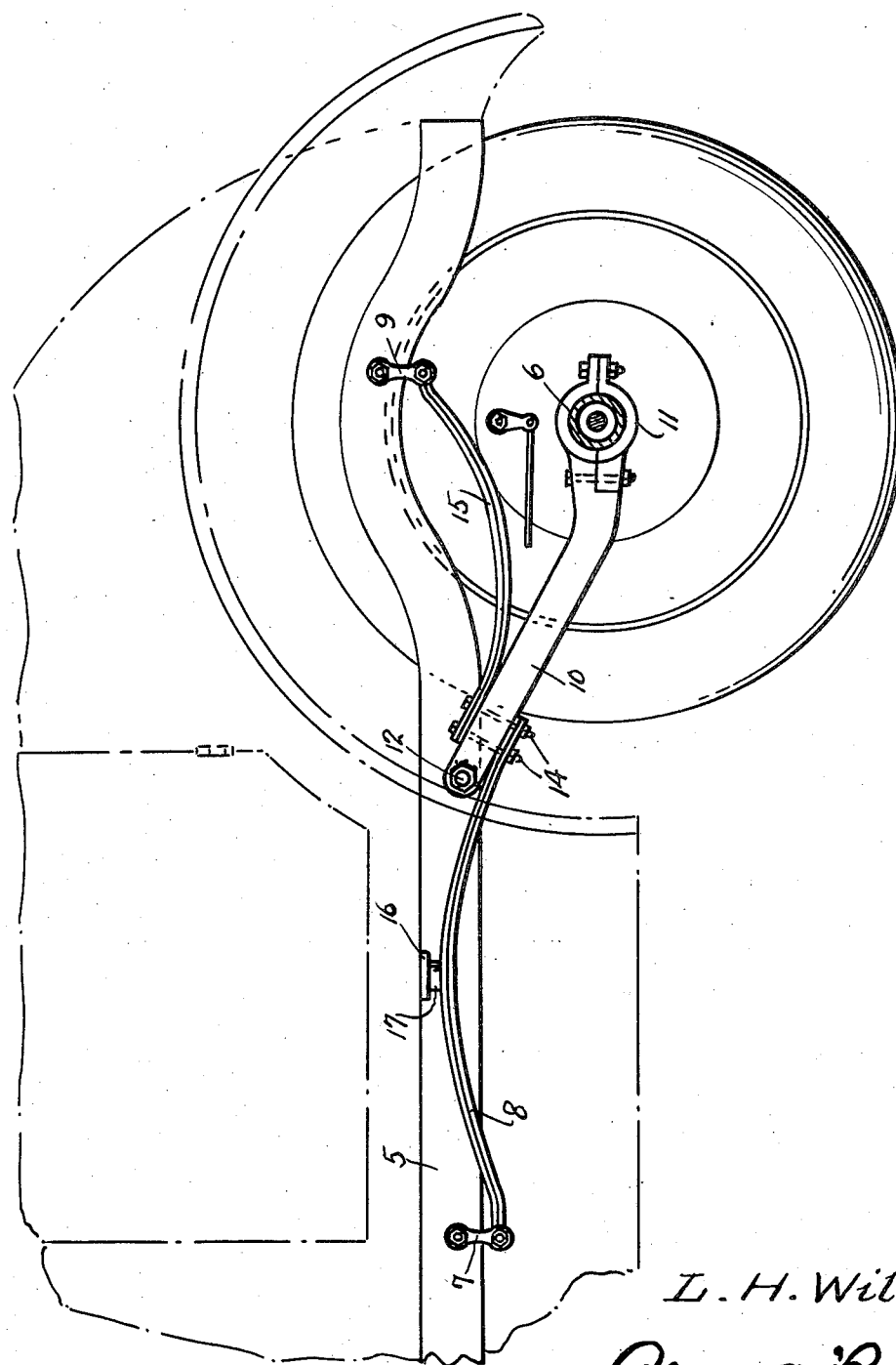
Figure 1 is a fragmentary side elevation of the rear end of an automobile chassis showing my spring construction associated therewith.

Referring to the drawings in detail, it will be seen that numeral 5 denotes the side beams of an automobile chassis or the like and numeral 6 denotes the housing of a rear axle construction of an automobile. These parts, of course, are conventional and have been illustrated merely to exemplify a practical embodiment of my invention. Numeral 7 denotes a spring shackle attached to chassis bar 5 and attached to the forward end of a spring 8 which is bowed upwardly and extends rearwardly from the shackle 7 to the outer side of the beam 5. It will be noted that I am referring to the spring structure in the singular as obviously the spring structure adjacent the other beam 5 is identical. Numeral 9 denotes another spring shackle mounted on the beam 5 a little rearwardly of the housing 6. It is to be noted that the shackle 7 is located quite a degree in advance of the housing 6 as compared with the rearward location of the shackle 9. Numeral 10 denotes an arm suitably clamped as at 11, at its rear end, on the axle housing 6 and this arm inclines upwardly and forwardly and has its upward forward end pivotally engaged by a suitable bolt or the like 12 on the beam 5 between the shackles 7 and 9. The rear end of the spring 8 is bolted as at 14 under the upper end of the arm 10 a little distance rearwardly of the bolt or pivot 12. Numeral 15 denotes a spring the rear end of which is engaged with the lower portion of the shackle 9 and this spring 15 is bowed downward and the forward end thereof is bolted as at 14 to the arm 10, above said arm. A bracket 16 is fixed to the beam 5 and projects outwardly therefrom over the central portion of the bowed spring 8 and is provided with a rubber bumper 17 against which impinges the central portion of the spring 8 thereby starting the shock absorbing feature of my spring construction.

It is thought that the operation, utility and advantages of this invention will now be quite apparent to those skilled in this art without a more detailed description thereof.

The present embodiment of the invention has been described in considerable detail merely for the purpose of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described the invention, what is claimed as new is:

1. In a vehicle spring construction of the class described, a rear axle housing, a chassis side beam, a pair of shackles attached to the beam one immediately rearwardly of the housing and the other in a substantial degree forwardly of the housing, an arm fixed to the housing and inclining upwardly and forwardly therefrom and pivotally engaged with the beam intermediate the shackles, an upwardly bowed spring attached to the forward shackle and extending rearwardly therefrom, and fixed to the arm under the forward upward end thereof, and a downwardly bowed spring having its rear end attached to the rear shackle and extending forwardly therefrom and having its forward end fixed to the upper end portion of the arm opposite to the rear end of the first mentioned spring.

2. In a vehicle spring construction of the class described, a rear axle housing, a chassis side beam, a pair of shackles attached to the beam one immediately rearwardly of the housing and the other in a substantial degree forwardly of the housing, an arm fixed to the housing and inclining upwardly and forwardly therefrom and pivotally engaged with the beam intermediate the shackles, an upwardly bowed spring attached to the forward shackle and extending rearwardly therefrom, and fixed to the arm under the forward upward end thereof, and a downwardly bowed spring having its rear end attached to the rear shackle and extending forwardly therefrom and having its forward end fixed to the upper end portion of the arm opposite to the rear end of the first mentioned spring, a bracket extending laterally from the beam and having a bumper depending therefrom for engagement with the intermediate portion of the first mentioned spring.

LYLE HUTCHINSON WILCOX.